United States Patent
Castinado et al.

(10) Patent No.: US 9,935,961 B2
(45) Date of Patent: Apr. 3, 2018

(54) CONTROLLING ACCESS TO DATA

(71) Applicant: Bank of America Corporation, Charlotte, NC (US)

(72) Inventors: Joseph B. Castinado, Northglenn, CO (US); Bonnie L. Dolan, Lincoln, CA (US); Charles R. Kendall, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 12 days.

(21) Appl. No.: 14/851,728

(22) Filed: Sep. 11, 2015

(65) Prior Publication Data
US 2017/0078299 A1 Mar. 16, 2017

(51) Int. Cl.
*H04L 29/06* (2006.01)
*G06F 17/30* (2006.01)
*G06Q 20/40* (2012.01)
*G06Q 20/32* (2012.01)

(52) U.S. Cl.
CPC ...... *H04L 63/102* (2013.01); *G06F 17/30312* (2013.01); *H04L 63/08* (2013.01); *H04L 63/107* (2013.01); *G06Q 20/3224* (2013.01); *G06Q 20/4016* (2013.01)

(58) Field of Classification Search
CPC ............ G06Q 20/3224; G06Q 20/4016; H04L 63/107
See application file for complete search history.

(56) References Cited

U.S. PATENT DOCUMENTS

| 6,089,451 | A  | * | 7/2000  | Krause  | G06K 7/084 235/380 |
| 6,779,113 | B1 | * | 8/2004  | Guthery | G06F 21/335 705/67 |
| 7,455,223 | B1 | * | 11/2008 | Wilson  | G06Q 20/18 221/9 |
| 7,853,521 | B2 | * | 12/2010 | Williams | G06Q 20/10 235/379 |
| 2003/0135463 | A1 | * | 7/2003 | Brown | G06Q 20/04 705/44 |
| 2003/0159066 | A1 | * | 8/2003 | Staw | H04L 63/10 726/21 |

(Continued)

OTHER PUBLICATIONS

Freeze! Discover Rolls Out Credit Card With On/Off Switch; Apr 17, 2015; NBC News; http://www.nbcnews.com/business/consumer/freeze-discover-rolls-out-credit-card-switch-n343396.*

(Continued)

*Primary Examiner* — James R Turchen
(74) *Attorney, Agent, or Firm* — Michael A. Springs

(57) ABSTRACT

A system for controlling access to data, includes: one or more interfaces operable to receive an access point deauthorization message, the access point deauthorization message including one or more access point identifiers; and one or more processors operable to: determine an account identifier associated with the access point identifier included in the received access point deauthorization message, and deauthorize an access point identified by the received access point identifier from accessing the financial account associated with the determined account identifier associated with the received access point identifier.

20 Claims, 9 Drawing Sheets

| User ID | Account ID | Access Point ID | Deauthorized | Deauthorized Reason |
|---|---|---|---|---|
| 123ABC | 456DEF | A,B,C and D | C | Lost |
| 123ABC | 789GHI | A,B,C and E | C | Lost |
| 123GHI | 012JKL | W,X,Y and Z | W | User Preference |

(56) References Cited

U.S. PATENT DOCUMENTS

| | | | |
|---|---|---|---|
| 2004/0155101 A1* | 8/2004 | Royer | G06O 20/04 235/379 |
| 2007/0055630 A1* | 3/2007 | Gauthier | G06Q 20/24 705/44 |
| 2007/0223685 A1* | 9/2007 | Boubion | G06F 21/31 380/2 |
| 2008/0010204 A1* | 1/2008 | Rackley, III | G06Q 20/042 705/45 |
| 2008/0035725 A1* | 2/2008 | Jambunathan | G06Q 20/32 235/380 |
| 2008/0126212 A1* | 5/2008 | Cox | G06K 19/06206 705/17 |
| 2008/0162346 A1* | 7/2008 | Aaron | G06Q 20/24 705/44 |
| 2008/0164308 A1* | 7/2008 | Aaron | G06Q 20/14 235/380 |
| 2008/0222038 A1* | 9/2008 | Eden | G06Q 20/04 705/44 |
| 2009/0150294 A1* | 6/2009 | March | G01S 5/0027 705/67 |
| 2009/0228384 A1* | 9/2009 | Melik-Aslanian | G06Q 20/342 705/35 |
| 2010/0023455 A1* | 1/2010 | Dispensa | G06Q 10/02 705/44 |
| 2010/0174639 A1* | 7/2010 | Melik-Aslanian | G06Q 20/342 705/38 |
| 2011/0035240 A1* | 2/2011 | Joao | G06Q 20/10 705/4 |
| 2011/0153437 A1* | 6/2011 | Archer | G06Q 20/10 705/17 |
| 2011/0202460 A1* | 8/2011 | Buer | G06O 20/1085 705/44 |
| 2012/0191614 A1* | 7/2012 | Babitch | G06Q 20/3829 705/71 |
| 2012/0238206 A1* | 9/2012 | Singh | H04L 63/0492 455/41.1 |
| 2012/0265682 A1* | 10/2012 | Menon | G06Q 20/20 705/44 |
| 2013/0030934 A1* | 1/2013 | Bakshi | G06Q 20/40 705/18 |
| 2013/0200999 A1* | 8/2013 | Spodak | G05B 1/01 340/5.65 |
| 2014/0040126 A1* | 2/2014 | Andrews | G06Q 20/105 705/41 |
| 2014/0214670 A1* | 7/2014 | McKenna | G06Q 20/40145 705/44 |
| 2014/0236831 A1* | 8/2014 | Flitcroft | G06Q 20/00 705/44 |
| 2014/0351070 A1* | 11/2014 | Christner | G06Q 30/0201 705/18 |
| 2015/0012436 A1* | 1/2015 | Poole | G06Q 20/204 705/44 |
| 2015/0073983 A1* | 3/2015 | Bartenstein | G06Q 20/3415 705/41 |
| 2015/0170137 A1* | 6/2015 | Balbus | G06Q 20/354 705/41 |
| 2015/0227903 A1* | 8/2015 | Votaw | G06Q 20/108 705/42 |
| 2015/0227927 A1* | 8/2015 | Votaw | G06Q 20/40 705/44 |
| 2015/0302413 A1* | 10/2015 | Dua | G06O 20/20 705/44 |
| 2015/0324789 A1* | 11/2015 | Dvorak | G06O 20/3823 705/67 |
| 2016/0063495 A1* | 3/2016 | Leger | G06O 20/4014 705/44 |
| 2016/0180330 A1* | 6/2016 | Feldman | G06Q 20/354 705/44 |
| 2016/0189142 A1* | 6/2016 | Chandru | G06Q 20/322 705/39 |
| 2016/0321663 A1* | 11/2016 | Batlle | G06Q 20/409 |
| 2017/0024744 A1* | 1/2017 | Finch | G06Q 20/204 |

OTHER PUBLICATIONS

"EmerCoin—Innovation in cryptocurreney," *EmerCoin International Development Group*, http://emercoin.com/, 7 pages, ©2015 EmerCoin International Development Group, 2015.

* cited by examiner

| User ID | Account ID | Access Point ID | Deauthorized | Deauthorized Reason |
|---|---|---|---|---|
| 123ABC | 456DEF | A,B,C and D | C | Lost |
| 123ABC | 789GHI | A,B,C and E | C | Lost |
| 123GHI | 012JKL | W,X,Y and Z | W | User Preference |

FIG. 2

| User ID | Account Alias | Account ID | Block Chain |
|---|---|---|---|
| 987ABC | ALPHA | 654DEF | BLOCK123 |
| 987ABC | BRAVO | 321GHI | BLOCK123 |
| 098JKL | CHARLIE | 765MNO | BLOCK456 |

FIG. 3

CONTROLLING ACCESS TO DATA

TECHNICAL FIELD

This disclosure relates generally to controlling access to data, and more particularly to controlling access to account data.

BACKGROUND

Enterprises often allow people (e.g., employees and/or customers) to have accounts (e.g., user accounts) with the enterprise. User accounts may provide access to user specific information and/or privileges. User information is often sensitive and may contain financial information and/or user identity information. Enterprises may restrict access to user account information by requiring, for example, passwords. However, users often have numerous accounts with different enterprises and users struggle to maintain access to their account passwords. Moreover, passwords are often illicitly obtained or determined by malicious entities. Further, accounts containing financial information may be used in real-time transactions prolonged user authentication would be burdensome.

SUMMARY OF EXAMPLE EMBODIMENTS

According to embodiments of the present disclosure, disadvantages and problems associated with providing internal services to external enterprises may be reduced or eliminated.

In certain embodiments, a system for controlling access to data includes: one or more interfaces operable to receive: an account identifier associated with a financial account, contact information for a wireless communication device associated with the financial account, authentication criteria associated with the financial account, the authentication criteria identifying required authentication data based on a value of the transaction; one or more interfaces operable to receive a proposed transaction message, the proposed transaction message including a value of a proposed transaction, an account identifier, and a location of the proposed transaction; one or more processors communicatively coupled to the one or more interfaces, the one or more processors operable to: determine a financial account associated with the received account identifier, determine contact information for a device associated with the received account identifier, and determine required authentication data for the proposed transaction based on the received account identifier and received value of the proposed transaction, the required form of authentication including one or more of: biometric authentication and location authentication; the one or more interfaces further operable to: communicate an authentication criteria message to the determined device associated with the received account identifier, the authentication criteria message identifying the form of authentication data required to complete the proposed transaction, receive a transaction authentication message, the transaction authentication message including authentication data associated with the proposed transaction; the one or more processors further operable to: determine that the received authentication data complies with the determined form of authentication for the proposed transaction, and authorize the proposed transaction with the financial account associated with the received account identifier.

In particular embodiments, a system for controlling access to data, includes: one or more memories operable to store account data, the account data including a plurality of account identifiers and a plurality of access point identifiers, the account identifiers identifying a financial account and the access point identifiers identifying an access point operable to access a financial account; one or more processors operable to associate each account identifier with one or more access point identifiers, each access point identifier associated with an account identifier such that the access point identified by the access point identifier is authorized to access the financial account identified by the financial account identifier associated with the access point identifier; one or more interfaces operable to receive an access point deauthorization message, the access point deauthorization message including one or more access point identifiers; and the one or more processors further operable to: determine an account identifier associated with the access point identifier included in the received access point deauthorization message; and deauthorize an access point identified by the received access point identifier from accessing the financial account associated with the determined account identifier associated with the received access point identifier.

In certain embodiments, a system for controlling access to data, includes: one or more interfaces operable to receive an account alias messages, an account alias message comprising an account alias and one or more account identifiers; one or more processors operable to associate received account aliases with received account identifiers; one or more memories operable to store the received account aliases and associated account identifiers; the one or more interfaces further operable to receive an account transaction message and a secure socket layer certificate generated with a block chain, the account transaction message comprising an account alias and a proposed transaction; the one or more processors further operable to: determine that the received account transaction message is valid based on the received secure socket layer certificate by verifying that information included in the secure socket layer certificate is stored in the block chain, determine an account identifier associated with an account alias received in an account transaction message, and authorize the received proposed transaction for a financial account associated with the determined account identifier.

Certain embodiments of the present disclosure may provide one or more technical advantages having specific technical effects.

In an embodiment, a system is operable to restrict account access points from accessing accounts, for example in the case of loss or theft of the access point, without disabling the account, thereby conserving the computational resources and bandwidth consumed by disabling an account, creating a new account, and granting account access points access to the new account.

In an embodiment, a system is operable to authenticate transactions using a block chain and without the communication of sensitive financial or identity information, thereby conserving the computational resources and bandwidth consumed by correcting fraudulent transactions.

In an embodiment, a system is operable to employ dynamic transaction authentication criteria, thereby conserving the computational resources and bandwidth consumed by unnecessarily requiring burdensome authentication requirements for low risk transactions or correcting fraudulent transactions due to lax authentication requirements for high risk transactions.

In an embodiment, a system is operable to employ near-frequency communication to authentication transactions, thereby conserving the computational resources and bandwidth consumed by correcting fraudulent transactions.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 illustrates a database table of an example system for controlling access to data;

FIG. 3 illustrates a database table of an example system for controlling access to data;

DETAILED DESCRIPTION

Embodiments of the present disclosure and its advantages are best understood by referring to FIGS. 1 through 9 of the drawings, like numerals being used for like and corresponding parts of the various drawings.

Figure 1:
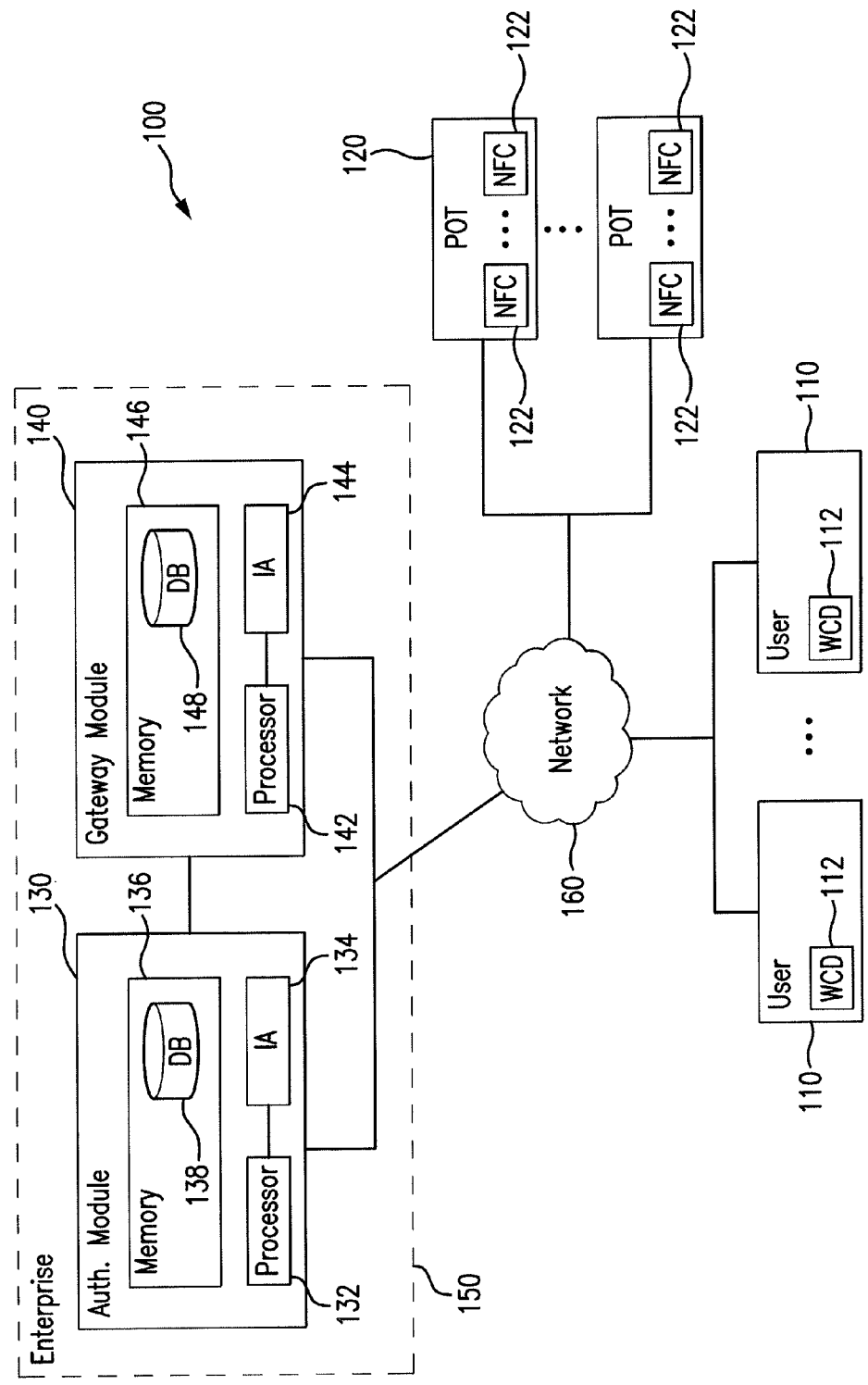
FIG. 1 illustrates an example system for controlling access to data.

FIG. 1 illustrates an example system 100 for controlling access to data. According to an embodiment, system 100 includes users 110, points-of-transaction ("POTs") 120, authorization module 130, gateway module 140, enterprise 150, and network 160. In certain embodiments, enterprise 150 includes one or more of authorization module 130 and control module 140. POTs 120 may include near frequency communication ("NFC") devices 122. Users 110 may be associated with wireless communication devices 112.

Users 110 represent users of system 100. In certain embodiments, users 110 are customers of enterprise 150 using services provided by authorization module 130 and/or gateway module 140. Users 110 may be associated with wireless communication devices 112. For example, each of users 110 may be associated with one or more wireless communication devices 112 and wireless communication devices 112 may act as contact point between system 100 and users 110. Wireless communication devices 112 may be operable to transmit biometric data of user 110 (e.g., fingerprint scans, iris scans, voice samples, etc.), heat maps of user 110 key strikes (e.g., position on key user 110 strikes with finger), or any other suitable information. In certain embodiments, wireless communication devices 112 are operable to execute software (e.g., an application) from enterprise 150. Users 110 may be associated with accounts (e.g., financial accounts maintained by enterprise 150) and accounts may be associated with account aliases (e.g., an alias used as a proxy for account and/or user 110 identity information) and account access points operable to access (e.g., execute transactions) associated accounts. Account aliases may be any suitable indicator for an account and may be uniquely identifiable across all users (e.g., e-mail address or phone number). Account access points may include magnetic stripe, wireless communication device, payment service providers (e.g., PayPal™), phone number, e-mail address, or other suitable access point.

POTs 120 represent points-of-transaction for transactions executed by users 110 (e.g., retailers, individuals, etc.). POTs 120 may include one or more near-frequency communication ("NFC") devices 122 operable to engage in NFC with wireless communication devices 112. In certain embodiments, POTs 120 are operable to communicate with users 110 (e.g., through wireless communication devices 112) and enterprise 150 (e.g., authentication module 130 and/or gateway module 140). For example, POTs 120 may communicate transaction requests to enterprise 150 (e.g., authentication module 130 and/or gateway module 140), may receive authentication requirements from enterprise 150 (e.g., authentication module 130), may receive authentication data from users 110 (e.g., via wireless communication device 112), communicate received authentication data to enterprise 150 (e.g., authentication module 130), receive transaction authorization from enterprise 150 (e.g., authentication module 130) authorizing a transaction with user 110, or communicate or receive any suitable information.

Authentication module 130 represents a component of system 100 operable to authenticate data and/or transactions. For example, authentication module 130 may maintain a data base (e.g., database 138) of authentication requirements associated with accounts. Authentication requirements may be determined by one or more of users 110 and enterprise 150. In certain embodiments, authentication requirements are dynamic and may be based on one or more of the value of a transaction, the POT 120 of the transaction, or any other suitable data. Authentication module 130 may further maintain account aliases associated with accounts (e.g., in database 138). In an embodiment, authentication module 130 includes a block chain operable to record transactions involving an account and then harden the records against tampering. For example, a block chain may represent a distributed database that maintains a continuously growing list of data records (e.g., of transactions) that are hardened against tampering and revision, even by operators (e.g., enterprise 150) of the block chain. An example of block chain would be a public ledger for cryptocurrencies. In certain embodiments, the block chain may be decentralized and maintained by several disparate entities, for example, to protect against an attack that could disable a centralized block chain repository. Block chains may be used by authentication module 130 to authentication transactions (e.g., initiated using account aliases) and allow transactions on accounts without communicating sensitive financial information or user 110 identity information. In certain embodiments, authentication module 130 includes one or more processors 132, interfaces 134, memories 136, and/or databases 138.

Gateway module 140 represents a component of system 100 operable to control access to accounts associated with users 110. For example, gateway module 140 may be operable to grant or deny account access points access to accounts associated with users 110. In an embodiment, users 110 may communicate access point authorization messages to gateway module 140 to grant an account access point access to an account associated with user 110, and communicate access point deauthorization messages to gateway module 140 to deny an account access point access to an account associated with user 110 (e.g., due to loss or theft of the account access point). In certain embodiments, gateway module 140 includes one or more processors 142, interfaces 144, memories 146, and/or databases 148.

Enterprise 150 represents an entity that maintains and/or operates authorization module 130 and/or gateway module 130. Enterprise 150 may be any suitable type of business entity. In certain embodiments, enterprise 150 has different business units or subdivisions that handle different business activities. Different subdivisions of enterprise 150 may maintain and/or operate one or more of authorization module 130 and/or gateway module 130. In particular embodiments, enterprises 150 may include organizations such as commercial banks, savings and loan associations, credit unions, Internet banks, mutual fund companies, brokerage firms, credit card companies, or other provider of electronic transaction services.

Network 160 represents any suitable network operable to facilitate communication between components of system 100, such as users 110, POTs 120, authorization module 130, gateway module 140, and/or enterprise 150. Network 160 may include any interconnecting system capable of transmitting audio, video, electrical signals, optical signals, data, messages, or any combination of the preceding. Network 160 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100 and third party enterprises 150.

A module (e.g., modules 130 and 140) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In embodiments where modules represent a server, the server may be a private server, and the server may be a virtual or physical server. Additionally, a module may include any suitable component that functions as a server.

Components of system 100, such as authorization module 130 and gateway module 140, may include one or more processors. A processor represents any computing device, such as processors 132 and 142, configured to control the operation of one or more components of system 100. A processor may comprise one or more processors and may be a programmable logic device, a microcontroller, a microprocessor, any suitable processing device, or any suitable combination of the preceding. A processor includes any hardware or software that operates to control and process information received by a component of system 100. In certain embodiments, a processor communicatively couples to other components of system 100, such as a module (e.g., modules 130 and 140), an interface (e.g., interfaces 134 and 144), a memory (e.g., memories 136 and 146), a database (e.g., databases 138 and 148), or any other suitable component.

An interface represents any device, such as interfaces 134 and 144, operable to receive input, send output, process the input or output, or perform other suitable operations for a component of system 100. An interface includes any port or connection, real or virtual, including any suitable hardware or software, including protocol conversion and data processing capabilities, to communicate through network 160. In certain embodiments, an interface includes a user interface (e.g., physical input, graphical user interface, touchscreen, buttons, switches, transducer, or any other suitable method to receive input from a user).

A memory represents any device, such as memories 136 and 146, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 138 and 148).

Logic may perform the operation of any component of system 100, for example, logic executes instructions to generate output from input. Logic may include hardware, software, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

In an embodiment, system 100 is operable to selectively authorize or deauthorize access points associated with accounts. For example, user 110 may have one or more accounts (e.g., financial accounts) with enterprise 150 and each of the one or more accounts may have one or more access points. User 110 may have a credit account (e.g., a credit card) with enterprise 150, and the credit account may be configured so that the credit account may be accessed (e.g., used in financial transactions) through a number of different access points (e.g., magnetic stripe, wireless communication device 112, payment service providers (e.g., PayPal™), phone number, e-mail address, or other suitable access point). In certain embodiments, system 100 is operable to disable one or more access points, for example, if an access point is compromised (e.g., lost or stolen credit card or wireless communication device 112 or hacked payment service providers) or if user 110 no longer wants an access point associated with the account.

User 110 can communicate an access point deauthorization message to enterprise 150, for example, through wireless communication device 112. An access point deauthorization message may include an identification of an access point, an identification of an account associated with the access point, authentication data, a reason for deauthorization (e.g., access point is compromised), and/or any other suitable information. In particular embodiments, authorization module 130 receives the access point deauthorization message from wireless communication device 112 and authenticates the received deauthorization message. If the access point deauthorization message is authenticated, gateway module 140 may deauthorize the access point identified in the deauthorization message from accessing the account identified in the deauthorization message. Accordingly, system 100 may deauthorize particular access points without disabling an account, thereby allowing users 110 to continue to make transactions on the account even if an associated access point is deauthorized.

User 110 may further communicate an access point authorization message to enterprise 150, for example, through wireless communication device 112. An access point authorization message may include an identification of an access point, an identification of an account associated with the access point, authentication data, a reason for authorization (e.g., lost access point found), and/or any other suitable information. In particular embodiments, authorization module 130 receives the access point authorization message from wireless communication device 112 and authenticates the received authorization message. If the access point authorization message is authenticated, gateway module 140 may authorize the access point identified in the deauthorization message from accessing the account identified in the deauthorization message.

In certain embodiments, an access point deauthorization message may include a reason for deauthorizing the identified access point. Reasons for deauthorizing an access point may include: the access point has been compromised (e.g., stolen, lost, hacked, or otherwise compromised), user 110 preference, or any other suitable reason. In an embodiment, if a deauthorization message indicates that an access point associated with an account has been compromised, enterprise 150 may change the authentication criteria associated with the account. For example, user 110 may communicate an access point deauthorization message indicating that a credit card has been stolen. Enterprise 110 may adjust authentication criteria associated with the account associated with the stolen credit card. For example, enterprise 110 may forbid any transaction on the account that is not initiated with wireless communication device 112 and authenticated with biometric information of user 110 (e.g., a thumb print). Authentication requirements associated with an account may be communicated to user 110 through wireless communication device 112 (e.g., via text message, e-mail, telephone call, software application, or any other suitable communication). User 110 control of access point authorization to access accounts is discussed in more detail below with respect to FIG. 2 and FIG. 7.

In certain embodiments, users 110 can execute transactions using an account alias (e.g., a phone number, an e-mail address, or any other suitable alias operable to identify an account associated with user 110) to perform "passwordless" transactions on the account. For example, system 100 (e.g., authentication module 130) may rely on a block chain to authenticate account aliases to ensure that transactions on an account associated with the account alias are authenticated. In an embodiment, user 110 (e.g., wireless communication devices 112) may generate a secure socket layer ("SSL") connection with enterprise 110 (e.g., authentication module 130) using a block chain as the "central authority" to authenticate the SSL connection. Block chain authentication is described in more detail below with respect to FIG. 3, FIG. 4, and FIG. 8. Using block chain authentication of account aliases, users 110 may perform transactions on accounts without revealing sensitive identity or account information to any entity other than enterprise 150. Accordingly, users 110 exposure to data breaches of POTs 120, hacking, or other compromising of sensitive identity or account information is reduced.

In an embodiment, user 110 associates an account (e.g., with enterprise 150) with an account alias, for example, an e-mail address. Control module 140 may include a database (e.g., database 148) that associates the account alias with the account, such that transactions identified by the account alias can be executed on the associated account. User 110 may execute a transaction on the account at POTs 120 by communicating (e.g., with wireless communication device 112) the account alias and a SSL authentication certificate (e.g., to POTs 120 or enterprise 150). The SSL authentication certificate may be authenticated (e.g., by authentication module 130) by verifying that the SSL authentication certificate includes authentication data (e.g., a digital signature) contained in a block chain used to generate the authentication certificate. In certain embodiments, to increase security, enterprise 150 requires an account alias, an authentication certificate (e.g., an SSL certificate generated with a block chain as the central authority), and one or more additional identifiers (e.g., phone number, e-mail address, etc.). Using the block chain to act as the central authority in an SSL connection allows users 110 to perform "passwordless" transactions and eliminates the threat of "man in the middle" attacks. Further, no sensitive financial or identity information associated with user 110 is communicated, thereby reducing the threat of such information being stolen. In particular embodiments, account alias and SSL authentication certificates can be communicated using near frequency communication ("NFC"), over the internet (e.g., using an application on wireless communication device 112), Bluetooth™, or any other suitable communication format.

In particular embodiments, system 100 employs a dynamic authentication protocol to authentication transactions initiated by users 110. For example, user 110 may initiate a transaction on an account held by enterprise 150 at POT 120. POT 120 may communicate a transaction request to enterprise 150 (e.g., authentication module 130). A transaction request may include one or more of an identifier of an account associated with user 110, a value of a proposed transaction, an identification of POT 110, location information associated with POT 110, or any other suitable information. Enterprise 150 (e.g., authentication module 130) may identify contact information for wireless communication device 112 based on the received transaction request (e.g., using an account identifier to identify associated wireless communications devices 112) and communicate an authentication request to wireless communication device 112. Authentication requests may identify required authentication data to be communicated from user 110 (e.g., via wireless communication device 112) to enterprise 150 (e.g., authentication module 130). In an embodiment, authentication requests prompt user 110 (e.g., through wireless communication device 112) to submit requested authentication data. Authentication responses from user 110 may include the requested authentication data and may be communicated to authentication module 130 and/or POTs 120. Authentication module 130 may determine whether the received authentication data complies with the authentication requirements and whether the received authentication data is valid (e.g., it is authentic to user 110). If authentication module 130 determines that the received authentication data is valid, authentication module 130 may communicate transaction authorization messages indicating that the transaction is authorized to one or more of user 110 and POTs 120.

Authentication data may include biometric information (e.g., finger print scans, retina scans, voice scans, or other suitable biometric data) of user 110, heat maps of touch pads (e.g., maps of where fingers strike keys), passwords, location information (e.g., GPS), SSL certificates, or any other suitable authentication data. In certain embodiments, system 100 (e.g., authentication module 130) maintains different authentication thresholds for different transactions. Authentication thresholds may be based on one or more of users 110 and enterprise 150, transaction value, transaction participants (e.g., POT 120), account activity, transaction location (e.g., POT 120 and/or wireless communication device 112), access point authorization or deauthorization messages, or any other suitable information. Dynamic authentication requirements are discussed in more detail below with respect to FIG. 5, and FIG. 9.

In an embodiment, authentication requirements may include communicating authentication data via near-frequency communication ("NFC") or other short range (e.g., low energy) communication protocol (e.g., Bluetooth, Beacon, etc.). For example, authentication module 130 may require that authentication data be communicated from user 110 to POT 120 to verify that user 110 is actually at POT 120. The range limitations (e.g., 10 cm) of NFC ensure that user 110 (e.g., wireless communication device 112) is within the NFC range of an NFC device at POT 120. Additionally, Authentication using NFC is explained in more detail below with respect to FIG. 6.

Modifications, additions, or omissions may be made to system 100. System 100 may include more, fewer, or other components. Any suitable component of system 100 may include a processor, interface, logic, memory, or other suitable element.

FIG. 2 illustrates a database table of an example system for controlling access to data. Table 200 includes user ID column 202, account ID column 204, access point ID column 206, deauthorized column 208, deauthorization reason column 210, and rows 212, 214, and 216. Certain columns may include identifiers ("IDs"). Identifiers represent any suitable indicia operable to identify data. In certain embodiments, identifiers uniquely identify data such that it can be linked to particular users, accounts, access points, or other suitable information.

User ID column 202 represents an identifier of a user (e.g., users 110) of system 100. Account ID column 204 represents an identifier of an account (e.g., a financial account) associated with the user (e.g., user 110) identified in user ID column 202. In certain embodiments, accounts identified in account ID column 204 are maintained by enterprise 150. Access point ID column 206 represents an identifier of an access point (e.g., magnetic stripe, wireless communication device, payment service providers (e.g., PayPal™), phone number, e-mail address, or other suitable access point) associated with an account identified in account ID column 204.

Deauthorized column 208 represents an identifier of account access points that have been deauthorized to access an account identified in account identifier column 204. Access points identified in deauthorized column 208 may have been deauthorized by enterprise 150 (e.g., authentication module 130) or users 110, and may be re-authorized (e.g., in response to an access point authorization message) to access an account identified in account identifier column 204. Deauthorized reason column 210 represents a cause (or reason) for deauthorizing an access point identified in deauthorized column 208 from accessing an account identified in account ID column 204. Reasons may be identified by users 110 in deauthorization messages, for example, that an access point was compromised because it was lost, stolen, hacked, or any other suitable reason. In certain embodiments, system 100 (e.g., authorization module 130) will adjust authorization requirements for an account associated with a deauthorized access point. For example, if an access point was lost, authorization module 130 may require special authentication requirements for transactions on accounts associated with the lost access point (e.g., require biometric and/or location based authentication).

Row 212 includes "123ABC" in user ID column 202, "456DEF" in account ID column 204, "A, B, C, and D" in account access point ID column 206, "C" in deauthorized column 208, and "lost" in deauthorization reason column 210. Row 214 includes "123ABC" in user ID column 202, "789GHI" in account ID column 204, "A, B, C, and E" in account access point ID column 206, "C" in deauthorized column 208, and "lost" in deauthorization reason column 210. Row 216 includes "123GHI" in user ID column 202, "012JKL" in account ID column 204, "W, X, Y, and Z" in account access point ID column 206, "W" in deauthorized column 208, and "User Preference" in deauthorization reason column 210.

Rows 212 and 214 of table 200 illustrate that a user ("123ABC") can have multiple accounts associated with account access points, and that the same access points can access multiple accounts. Similarly, an access point deauthorized for one account due to loss may be deauthorized for another account for the same reason. Row 216 of table 200 illustrates that access points can be deauthorized for accounts due to user preference.

Modifications, additions, or omissions may be made to table 200. Table 200 may include more or less fields, and may include any information relevant to controlling access to data. Table 200 may include any suitable amount of information and may be stored in any suitable type or number of memories.

FIG. 3 illustrates a database table of an example system for controlling access to data. Table 300 includes user ID column 302, account alias column 304, account ID column 306, and block chain column 308. Certain columns may include identifiers ("IDs"). Identifiers represent any suitable indicia operable to identify data. In certain embodiments, identifiers uniquely identify data such that it can be linked to particular users, accounts, access points, or other suitable information.

User ID column 302 represents an identifier of a user (e.g., users 110) of system 100. Account alias column 304 represents an identifier (e.g., an alias) for an account identified in account ID column 306. In certain embodiments, account aliases may be uniquely identifiable identifiers (e.g., telephone numbers or e-mail addresses). Account ID column 306 represents an identifier of an account (e.g., a financial account) associated with the user (e.g., user 110) identified in user ID column 302. In certain embodiments, accounts identified in account ID column 306 are maintained by enterprise 150. Block chain ID column 308 represents a block chain that stores authentication information (e.g., hashes of SSL certificates). Transactions performed on an account identified in account ID column 306 may be recorded in the block chain identified in block chain column 308.

Row 310 includes "987ABC" in user ID column 302, "ALPHA" in account alias column 304, "654DEF" in account ID column 306, and "BLOCK123" in block chain ID column 308. Row 312 includes "987ABC" in user ID column 302, "BRAVO" in account alias column 304, "321GHI" in account ID column 306, and "BLOCK123" in block chain ID column 308. Row 314 includes "098JKL" in user ID column 302, "CHARLIE" in account alias column 304, "765MNO" in account ID column 306, and "BLOCK456" in block chain ID column 308.

Rows 310 and 312 illustrate that a single user ("987ABC") can maintain different accounts ("654DEF" and "321GHI") with different account aliases ("ALPHA" and "BRAVO"), where transactions are recorded on the same block chain ("BLOCK123"). Row 314 illustrates that different users may have transactions recorded on different block chains (e.g., user "987ABC" transactions are recorded on block chain "BLOCK123" and user "098JKL" transactions are recorded on block chain "BLOCK456"). In the illustrated embodiment, account aliases are unique to the associated account such that there are not duplicative account aliases used between users.

Modifications, additions, or omissions may be made to table 300. Table 300 may include more or less fields, and may include any information relevant to controlling access to data. Table 300 may include any suitable amount of information and may be stored in any suitable type or number of memories.

Figure 4:
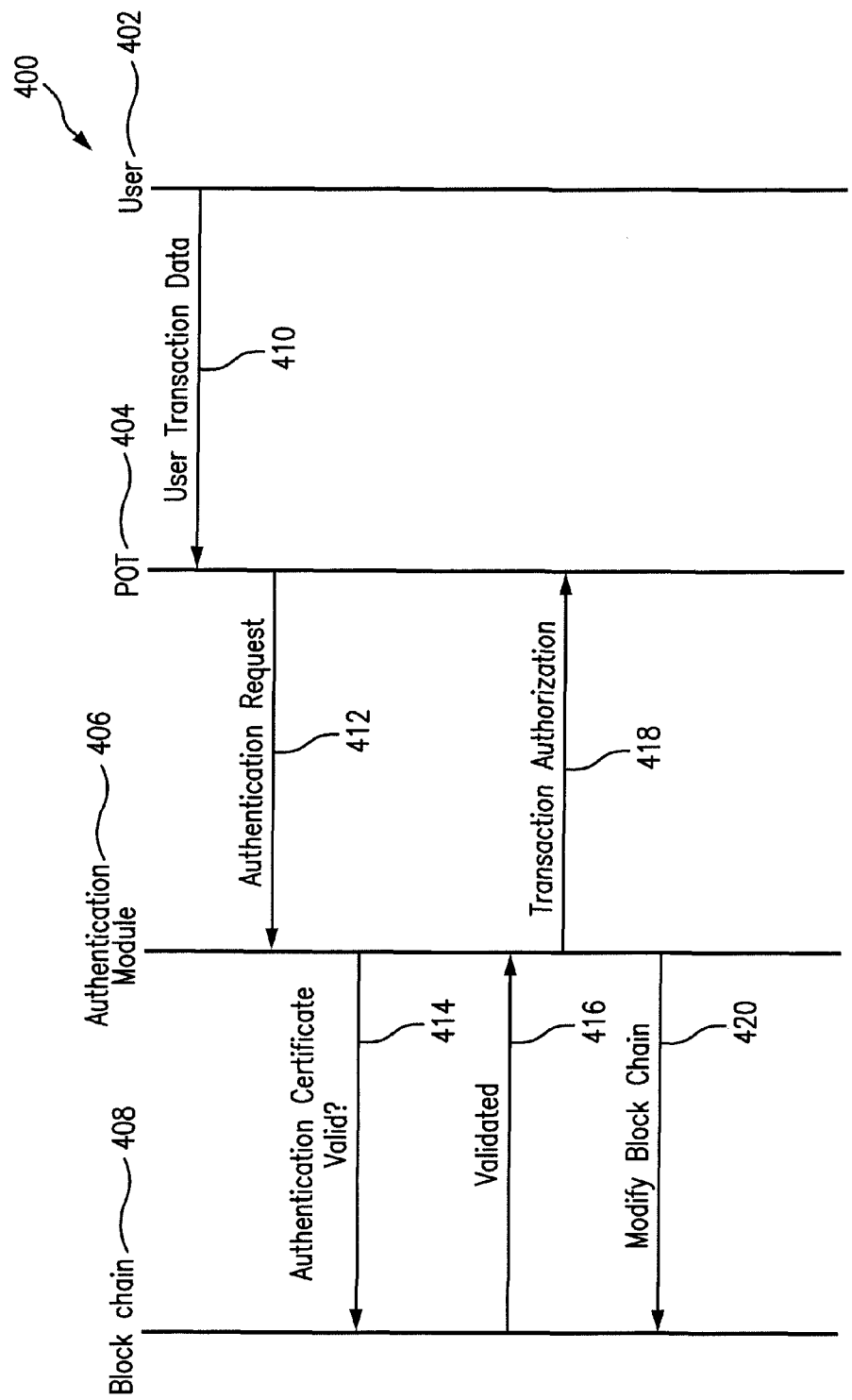
FIG. 4 illustrates a message flow of an example system for controlling access to data.

FIG. 4 illustrates a message flow 400 of an example system for controlling access to data. Message flow 400 includes user 402, POT 404, authentication module 406, and block chain 408. In the illustrated embodiment, user 402 is able to execute a transaction on a financial account associated with an account alias by communicating only the account alias and an authentication certificate (e.g., a SSL certificate) and without communicating any sensitive identity (e.g., name, address, social security number, passwords, etc.) or sensitive financial information (e.g., account numbers, account passwords, etc.).

User 402 represents a user of system 100 (e.g., user 110) and communication may be performed with user 402 through wireless communication device 112 associated with user 402. POT 404 represents a point of transaction engaged in a financial transaction with user 402 (e.g., a retailer selling products to user 402). Authentication module 406 represents a component of system 100 operable to authenticate data (e.g., authentication module 130). Block chain 408 represents a block chain operable to store transaction data. Block chain 408 may include a distributed database that maintains a continuously growing list of data records that are hardened against tampering and revision, even by operators of the block chain. An example of block chain would be a public ledger for cryptocurrencies.

In the illustrated embodiment, at 410 user 402 engages in a transaction with POTs 404 and communicates a user transaction data including an account alias and an authentication certificate (e.g., and SSL certificate) with data recorded in block chain 408 associated with user 402. User transaction data may be communicated in any suitable form, including near frequency communication ("NFC") from wireless communication device 112. At 412, POTs 404 forwards the user transaction data to authentication module 406 in an authentication request. At 414, authentication module 406 may determine an account associated with the account alias to use for the transaction between user 402 and POT 404 and may further determine whether the transaction is authentic by verifying that data from the received authentication certificate is stored on block chain 408. At 416, authentication module 406 determines that the authentication certificate is valid (e.g., because block chain 408 includes data from the received authentication certificate). At 418, authentication module 406 communicates a transaction authorization message notifying POT 404 that the transaction with user 402 is authorized. At 420, authentication module 406 modifies block chain 408 to record the transaction. Accordingly, user 402 is able to engage in a transaction with POT 404 without communicating sensitive financial or personal information, and authentication module 406 is able to authenticate the transaction by relying on block chain 408 to store records of transactions and then harden the data against tapering.

Modifications, additions, or omissions may be made to message flow 400. Message flow 400 may include more, fewer, or other messages, and the messages may include any information relevant to controlling access to data. Additionally, messages may be communicated in any suitable order, in parallel, and/or sequentially. Any suitable component may communicate any message of message flow 400.

Figure 5:
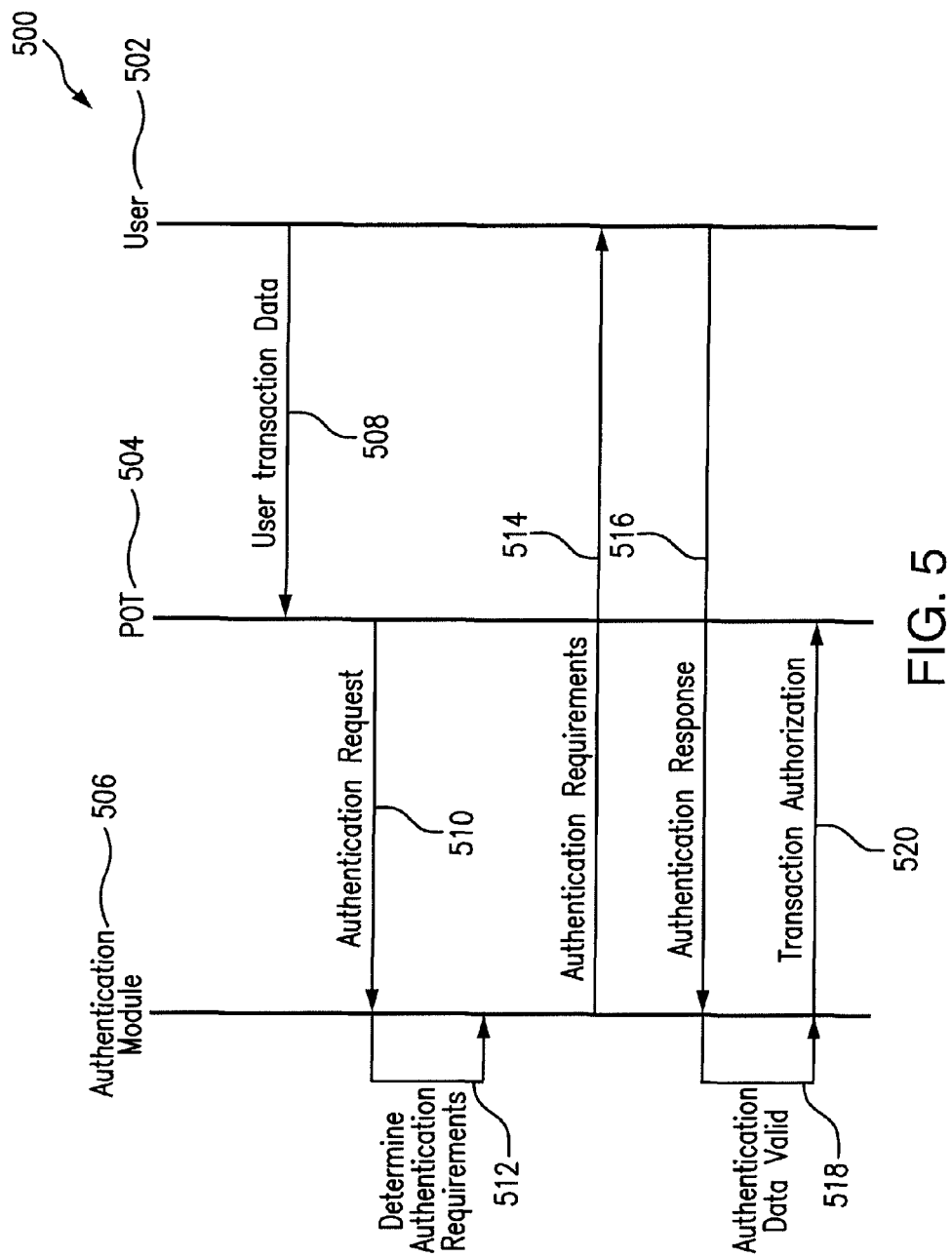
FIG. 5 illustrates a message flow of an example system for controlling access to data.

FIG. 5 illustrates a message flow 500 of an example system for controlling access to data. Message flow 500 includes user 502, POT 504, and authentication module 506. In the illustrated embodiment, user 502 is able to execute a transaction on a financial account according to dynamic authentication requirements. User 502 represents a user of system 100 (e.g., user 110) and communication may be performed with user 502 through wireless communication device 112 associated with user 502. POT 504 represents a point of transaction engaged in a financial transaction with user 502 (e.g., a retailer selling products to user 502). Authentication module 506 represents a component of system 100 operable to authenticate data (e.g., authentication module 130).

In the illustrated embodiment, at 508 user 502 communicates user transaction data to POT 504. User transaction data may include an identification of an account to use in the transaction with POT 504. At 510, POT 504 communicates an authentication request to authentication module 506 including one or more of the received user transaction data, a value of the transaction (e.g., an amount of money involved in the transaction), and identification information for POT 504. At 512, authentication module determines authentication requirements for the transaction based on one or more of the value of the transaction and authentication requirements associated with the account identified in the user transaction data. For example, user 502 and/or enterprise 150 may set authentication requirements based on one or more of the value of the transaction and the POT involved in the transaction. At 514, authentication module 506 communicates authentication requirements to user 502 to complete the transaction (e.g., at wireless communication device 112 associated with user 502). Authentication requirements may include biometric authentication (e.g., fingerprint scan, retina scan, voice recognition, etc.), location information (e.g., GPS coordinates) of user 502, or other suitable authentication data. Authentication data may be received by wireless communication device 112 associated with user 502. At 516, user 502 communicates an authentication response with the requested authentication data. At 518, authentication module determines whether the received authentication data is valid. At 520, if the authentication data is valid, authentication module communicates a transaction authorization message to POT 504 indicating that the transaction between POT 504 and user 502 is authorized.

Modifications, additions, or omissions may be made to message flow 500. Message flow 500 may include more, fewer, or other messages, and the messages may include any information relevant to controlling access to data. Additionally, messages may be communicated in any suitable order, in parallel, and/or sequentially. Any suitable component may communicate any message of message flow 500.

Figure 6:
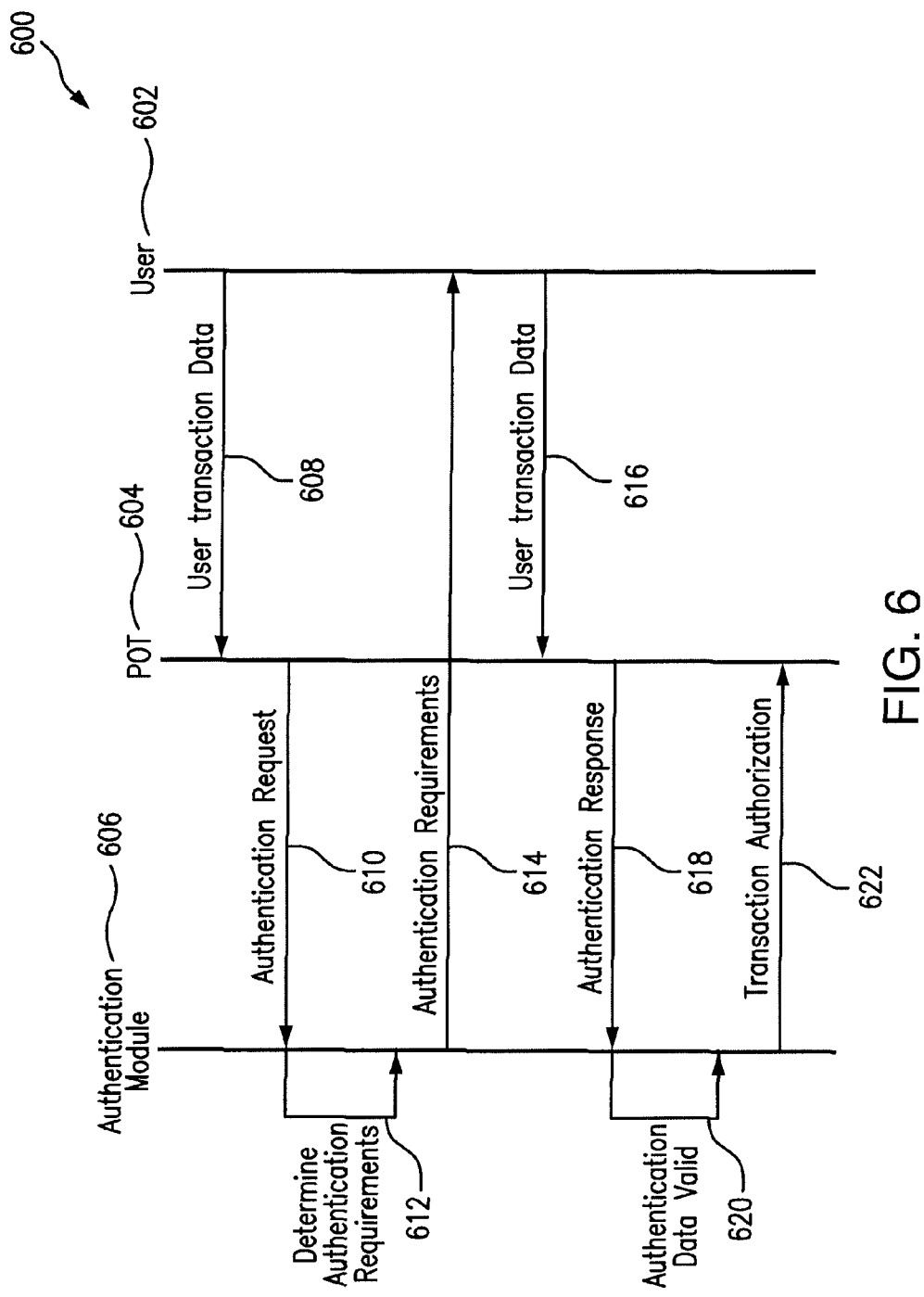
FIG. 6 illustrates a message flow of an example system for controlling access to data.

FIG. 6 illustrates a message flow 600 of an example system for controlling access to data. Message flow 600 includes user 602, POT 604, and authentication module 606. In the illustrated embodiment, user 602 is able to execute a transaction on a financial account using near frequency communication ("NFC") for authentication of the transaction. User 602 represents a user of system 100 (e.g., user 110) and communication may be performed with user 602 through wireless communication device 112 associated with user 602. POT 604 represents a point of transaction engaged in a financial transaction with user 602 (e.g., a retailer selling products to user 602). Authentication module 606 represents a component of system 100 operable to authenticate data (e.g., authentication module 130).

In the illustrated embodiment, at 608 user 602 communicates user transaction data to POT 604. User transaction data may include an identification of an account to use in the transaction with POT 604. At 610, POT 604 communicates an authentication request to authentication module 606 including one or more of the received user transaction data, a value of the transaction (e.g., an amount of money involved in the transaction), and identification information for POT 604. At 612, authentication module determines authentication requirements for the transaction based on one or more of the value of the transaction and authentication requirements associated with the account identified in the user transaction data. For example, user 602 and/or enterprise 150 may set authentication requirements based on one or more of the value of the transaction and the POT involved in the transaction. At 614, authentication module 606 communicates authentication requirements to user 602 to complete the transaction (e.g., at wireless communication device 112 associated with user 602) that include a requirement that user 602 communicate authentication data complying with the authentication requirements to POT 604 via NFC. Authentication requirements may include biometric authentication (e.g., fingerprint scan, retina scan, voice recognition, etc.), location information (e.g., GPS coordinates) of user 602, or other suitable authentication data. Authentication data may be received by wireless communication device 112 associated with user 602. At 616, user 602 communicates an authentication response with the requested authentication data to POT 604 via NFC. At 618, POT 604 communicates the authentication response received via NFC from user 602 to authentication module 606. At 620, authentication module 606 verifies that the received authentication data is valid. At 622, if the authentication data is valid, authentication module communicates a transaction authorization message to POT 604 indicating that the transaction between POT 604 and user 602 is authorized. Accordingly, authentication module 606 may rely on the distance limitations of NFC communication to verify that user 602 is actually at POT 604. For example, if authentication module 606 required that user 602 communicate a finger print scan to POT 604 via NFC, then authentication module 606 would know that user 602 is likely at POT 604.

Modifications, additions, or omissions may be made to message flow 600. Message flow 600 may include more, fewer, or other messages, and the messages may include any information relevant to controlling access to data. Additionally, messages may be communicated in any suitable order, in parallel, and/or sequentially. Any suitable component may communicate any message of message flow 600.

Figure 7:
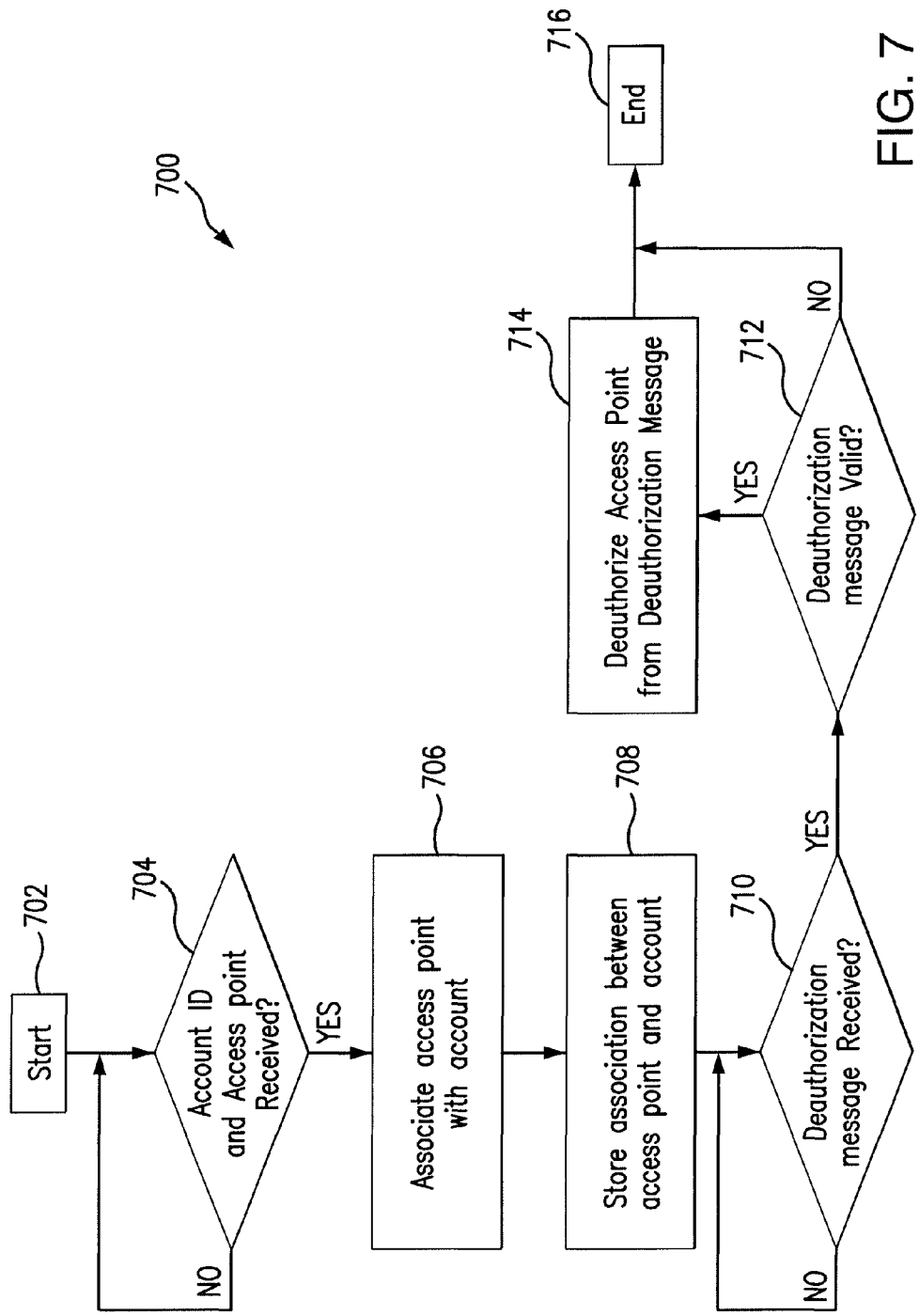
FIG. 7 illustrates a flow diagram of an example method for controlling access to data, according to certain embodiments of the present disclosure.

FIG. 7 illustrates a flow diagram of an example method 700 for controlling access to data, according to certain embodiments of the present disclosure. Method 700 begins at step 702. At step 704, it is determined (e.g., by authentication module 130) whether an account ID and access point ID have been received (e.g., by user 110). If an account ID and access point ID have not been received, the method returns to step 704. If an account ID and access point ID have been received, the method continues to step 706 and the received access point ID is associated with the received account ID and stored at step 708. At step 710, it is determined (e.g., by authentication module 130) whether a deauthorization message has been received. If a deauthorization message has not been received, the method returns to step 710. If a deauthorization message has been received, the method continues to step 712 and it is determined (e.g., by authentication module 130) whether the deauthorization message is valid. If the deauthorization message is not valid, the method ends at step 716. If the deauthorization message is valid, the method continues to step 714 and an access point identified in the deauthorization message is deauthorized from accessing an associated account (e.g., by gateway module 140). The method ends at step 716.

Modifications, additions, or omissions may be made to method 700. The method may include more, fewer, or other steps. Additionally, steps may be performed in any suitable order, in parallel, and/or sequentially. Any suitable component may perform one or more steps of method 700.

Figure 8:
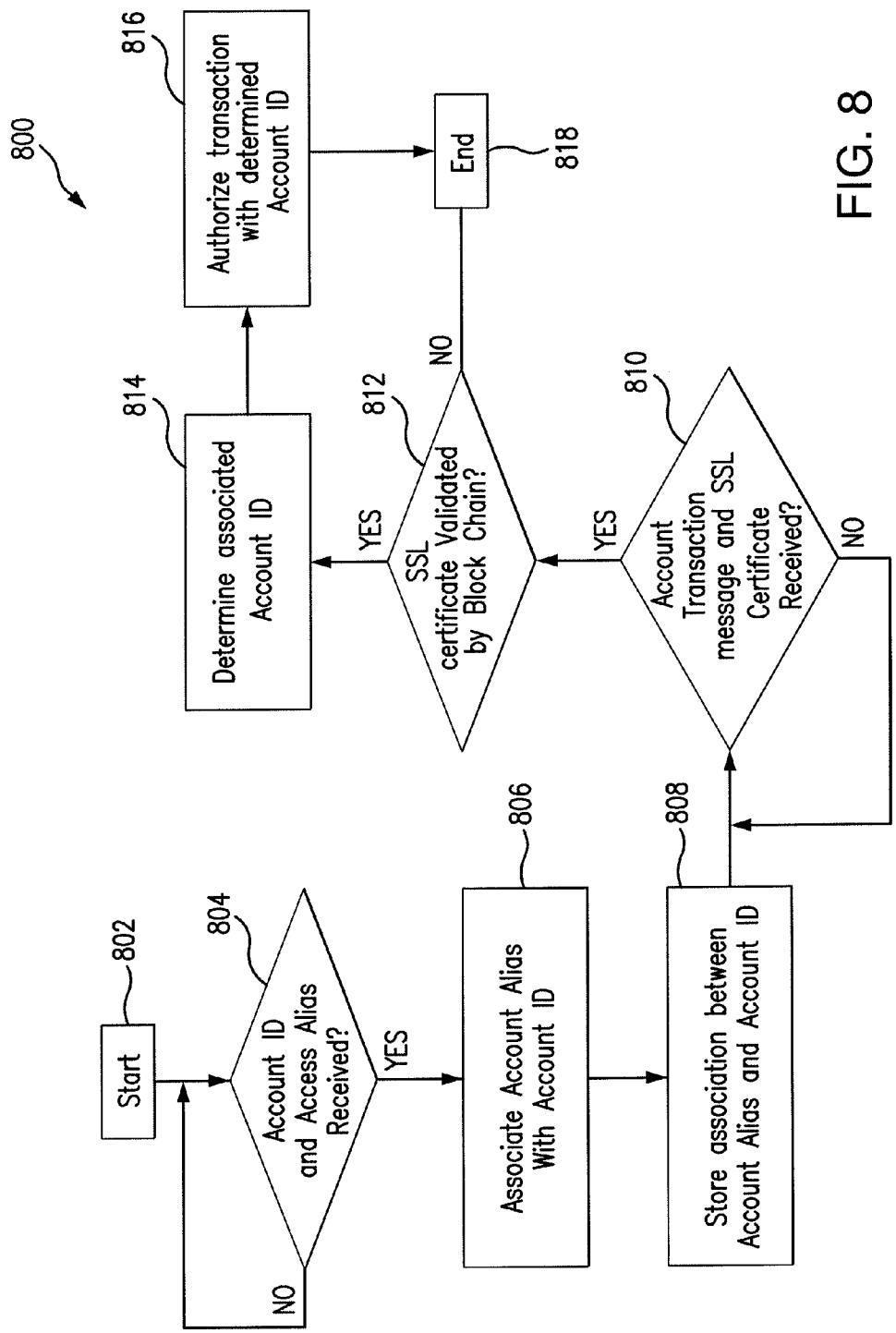
FIG. 8 illustrates a flow diagram of an example method for controlling access to data, according to certain embodiments of the present disclosure.

FIG. 8 illustrates a flow diagram of an example method 800 for controlling access to data, according to certain embodiments of the present disclosure. Method 800 begins at step 802. At step 804, it is determined (e.g., by authentication module 130) whether an account ID and an account alias have been received. If an account ID and an account alias have not been received, the method returns to step 804. If an account ID and an account alias have been received, the method continues to step 806 and the received account ID and account alias are associated and then stored at step 808. At step 810, it is determined (e.g., by authentication module 130 whether an account transaction message and SSL certificate have been received. If an account transaction message and SSL certificate have not been received, the method returns to step 810. If an account transaction message and SSL certificate have been received, the method continues to step 812 and it is determined (e.g., by authentication module 130) whether the received SSL certificate is validated by a block chain. If the received SSL certificate is not validated by the block chain, the method ends at step 818. If the received SSL certificate is validated by the block chain, the method continues to step 814 and an account ID associated with the an account alias received in the account transaction message is determined. At step 816, a transaction with the determined account ID is authorized and the method ends at step 818.

Modifications, additions, or omissions may be made to method 800. The method may include more, fewer, or other steps. Additionally, steps may be performed in any suitable order, in parallel, and/or sequentially. Any suitable component may perform one or more steps of method 800.

Figure 9:
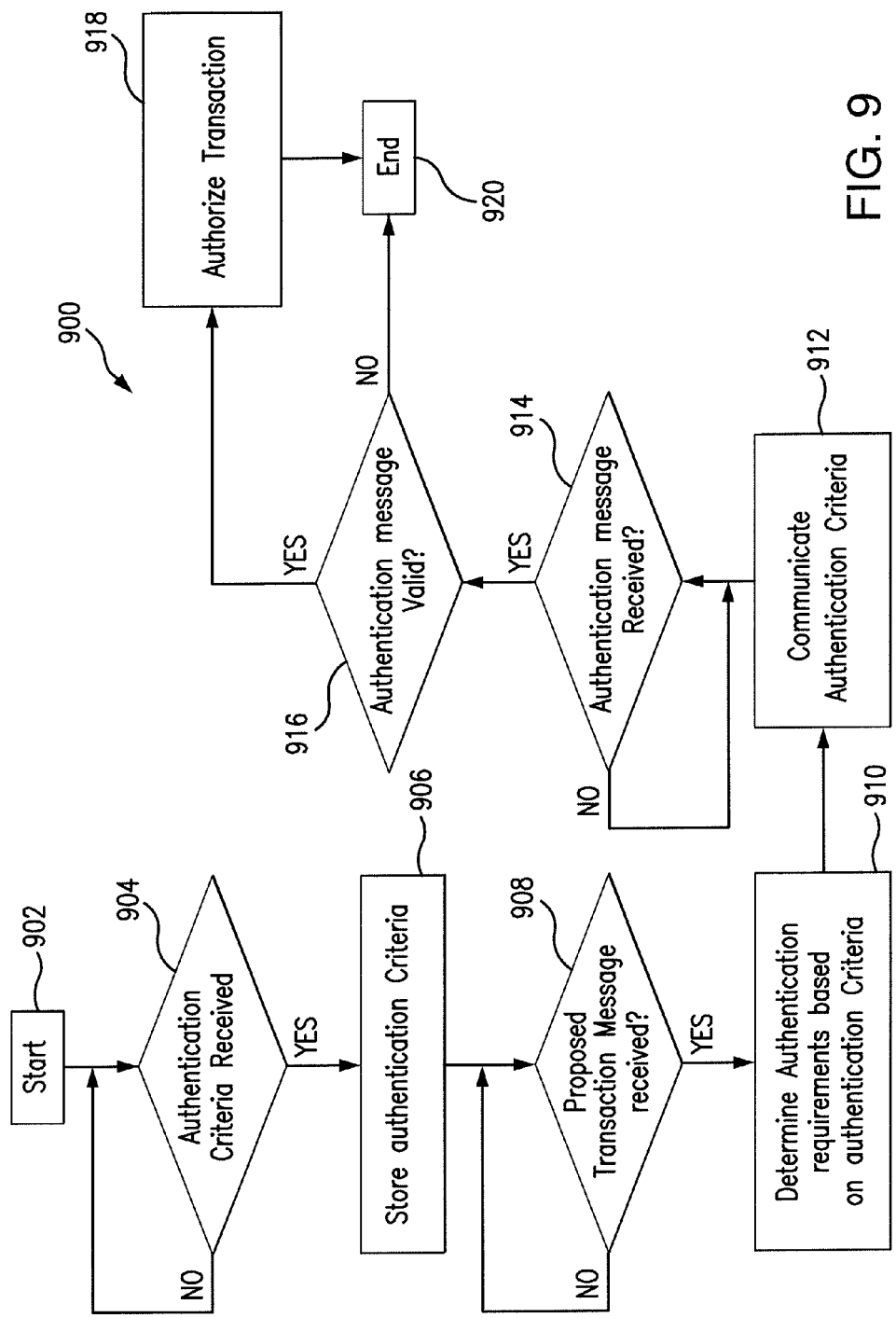
FIG. 9 illustrates a flow diagram of an example method for controlling access to data, according to certain embodiments of the present disclosure.

FIG. 9 illustrates a flow diagram of an example method 900 for controlling access to data, according to certain embodiments of the present disclosure. Method 900 begins at step 902. At step 904, it is determined (e.g., by authentication module 130) whether authentication criteria has been received (e.g., from user 110 and/or enterprise 150). If authentication criteria has not been received, the method returns to step 904. If authentication criteria has been received, the method continues to step 906 and the authentication criteria is stored. At step 908, it is determined (e.g., by authentication module 130) whether a proposed transaction message has been received. If a proposed transaction message has not been received, the method returns to step 908. If a proposed transaction message has been received, the method continues to step 910. At step 910, authentication requirements are determined based on authentication criteria associated with an account identified in the received proposed transaction message. At step 912, the determined authentication requirements are communicated to a user associated with the account identified in the received proposed transaction message (e.g., wireless communication device 112). At step 914, it is determined whether an authentication message with the requested authentication data complying with the communicated authentication requirements has been received. If an authentication message with the requested authentication data complying with the communicated authentication requirements has not been received, the method returns to step 914. If an authentication message with the requested authentication data complying with the communicated authentication requirements has been received, the method continues to step 916 and it is determined whether the received authentication data is valid. If the received authentication data is not valid, the method ends at step 920. If the received authentication data is valid, the method continues to step 918. At step 918, the transaction identified in the proposed transaction message is authorized and the method ends at step 920.

Modifications, additions, or omissions may be made to method 900. The method may include more, fewer, or other steps. Additionally, steps may be performed in any suitable order, in parallel, and/or sequentially. Any suitable component may perform one or more steps of method 900.

In an embodiment, a system is operable to restrict account access points from accessing accounts, for example in the case of loss or theft of the access point, without disabling the account, thereby conserving the computational resources and bandwidth consumed by disabling an account, creating a new account, and granting account access points access to the new account.

In an embodiment, a system is operable to authenticate transactions using a block chain and without the communication of sensitive financial or identity information, thereby conserving the computational resources and bandwidth consumed by correcting fraudulent transactions.

In an embodiment, a system is operable to employ dynamic transaction authentication criteria, thereby conserving the computational resources and bandwidth consumed by unnecessarily requiring burdensome authentication requirements for low risk transactions or correcting fraudulent transactions due to lax authentication requirements for high risk transactions.

In an embodiment, a system is operable to employ near-frequency communication to authentication transactions, thereby conserving the computational resources and bandwidth consumed by correcting fraudulent transactions.

Other technical advantages of the present disclosure will be readily apparent to one skilled in the art from the following figures, descriptions, and claims. Moreover, while specific advantages have been enumerated above, various embodiments may include all, some, or none of the enumerated advantages.

What is claimed is:

1. A system for controlling access to data, comprising:
   one or more memories comprising one or more databases,
      the one or more databases operative to store account data, the account data including a plurality of account identifiers and a plurality of access point identifiers, wherein:
      each of the account identifiers identifies an account; and
      each of the access point identifiers identifies an access point operable to access the account;
   one or more processors communicatively coupled to the one or more memories, the one or more processors operative to associate each account identifier with one or more access point identifiers, wherein:
      each access point identifier is associated with an account identifier such that the access point identified by the access point identifier is authorized to access the account identified by the account identifier associated with the access point identifier;
   one or more interfaces communicatively coupled to the one or more processors, the one or more interfaces operative to receive an access point deauthorization message, wherein:
      the access point deauthorization message including one or more access point identifiers, and
      the access point deauthorization message indicates an account has been compromised; and
   the one or more processors further operable to:
      determine an account identifier associated with the access point identifier included in the received access point deauthorization message;
      deauthorize an access point identified by the received access point identifier from accessing the account associated with the determined account identifier associated with the received access point identifier, wherein at least one other access point for the account remains authorized to make transactions on the account; and
      adjust authorization requirements for the account associated with the deauthorized access point in response to deauthorizing the access point, wherein adjusting the authorization requirements comprises requiring location based authentication by communicating a biometric signal to a point of sale device using a short range communication protocol.

2. The system of claim 1, the one or more interfaces further operative to receive an access point authorization message, the access point authorization message including one or more access point identifiers; and
   the one or more processors further operative to:
      determine an account identifier associated with the access point identifier included in the received access point deauthorization message; and
      authorize an access point identified by the received access point identifier to access the account associated with the determined account identifier associated with the received access point identifier.

3. The system of claim 1, the access points identified by the access point identifiers including one or more from the set comprising: wireless communication devices, magnetic stripes, near frequency communication chips, e-mail addresses, telephone numbers, and account identifiers.

4. The system of claim 1, the one or more processors further operative to authenticate the received access point deauthorization message.

5. The system of claim 1, wherein an account identified by an account identifier associated with a deauthorized access point identifier remains activated.

6. The system of claim 1, wherein at least one of the plurality of account identifiers is associated with a plurality of access point identifiers.

7. The system of claim 1, the one or more processors operative to deauthorize an account access identifier in response to transactions on the account associated with the account access identifier.

8. A non-transitory computer-readable medium comprising logic for controlling access to data, the logic when executed by a processor operative to:
- store account data, the account data including a plurality of account identifiers and a plurality of access point identifiers, each of the account identifiers identifies an account and the access point identifiers identifying an access point operable to access the account;
- associate each account identifier with one or more access point identifiers, each access point identifier associated with an account identifier such that the access point identified by the access point identifier is authorized to access the account identified by the account identifier associated with the access point identifier;
- receive an access point deauthorization message, wherein:
  - the access point deauthorization message including one or more access point identifiers, and
  - the access point deauthorization message indicates an account has been compromised; and
- determine an account identifier associated with the access point identifier included in the received access point deauthorization message;
- deauthorize an access point identified by the received access point identifier from accessing the account associated with the determined account identifier associated with the received access point identifier, wherein at least one other access point for the account remains authorized to make transactions on the account; and
- adjust authorization requirements for the account associated with the deauthorized access point in response to deauthorizing the access point, wherein adjusting the authorization requirements comprises requiring location based authentication by communicating a biometric signal to a point of sale device using a short range communication protocol.

9. The non-transitory computer-readable medium of claim 8, the logic operative to:
- receive an access point authorization message, the access point authorization message including one or more access point identifiers;
- determine an account identifier associated with the access point identifier included in the received access point deauthorization message; and
- authorize an access point identified by the received access point identifier to access the account associated with the determined account identifier associated with the received access point identifier.

10. The non-transitory computer-readable medium of claim 8, the access points identified by the access point identifiers including one or more from the set comprising: wireless communication devices, magnetic stripes, near frequency communication chips, e-mail addresses, telephone numbers, and account identifiers.

11. The non-transitory computer-readable medium of claim 8, the logic further operative to authenticate the received access point deauthorization message.

12. The non-transitory computer-readable medium of claim 8, wherein an account identified by an account identifier associated with a deauthorized access point identifier remains activated.

13. The non-transitory computer-readable medium of claim 8, wherein at least one of the plurality of account identifiers is associated with a plurality of access point identifiers.

14. The non-transitory computer-readable medium of claim 8, the logic further operative to deauthorize an account access identifier in response to transactions on the account associated with the account access identifier.

15. A method for controlling access to data, comprising:
- storing account data, the account data including a plurality of account identifiers and a plurality of access point identifiers, each of the account identifiers identifies an account and the access point identifiers identifying an access point operable to access the account;
- associating, by one or more processors, each account identifier with one or more access point identifiers, each access point identifier associated with an account identifier such that the access point identified by the access point identifier is authorized to access the account identified by the account identifier associated with the access point identifier;
- receiving an access point deauthorization message, wherein:
  - the access point deauthorization message including one or more access point identifiers, and
  - the access point deauthorization message indicates an account has been compromised; and
- determining, by one or more processors, an account identifier associated with the access point identifier included in the received access point deauthorization message;
- deauthorizing, by one or more processors, an access point identified by the received access point identifier from accessing the account associated with the determined account identifier associated with the received access point identifier, wherein at least one other access point for the account remains authorized to make transactions on the account; and
- adjusting, by the one or more processors, authorization requirements for the account associated with the deauthorization access point in response to deauthorizing the access point, wherein adjusting the authorization requirements comprises requiring location based authentication by communicating a biometric signal to a point of sale device using a short range communication protocol.

16. The method claim 15, further comprising:
- receiving an access point authorization message, the access point authorization message including one or more access point identifiers;
- determining, by one or more processors, an account identifier associated with the access point identifier included in the received access point deauthorization message; and
- authorizing, by one or more processors, an access point identified by the received access point identifier to access the account associated with the determined account identifier associated with the received access point identifier.

17. The method claim 15, the access points identified by the access point identifiers including one or more from the set comprising: wireless communication devices, magnetic stripes, near frequency communication chips, e-mail addresses, telephone numbers, and account identifiers.

18. The method of claim 15, further comprising authenticating, by one or more processors, the received access point deauthorization message.

19. The method of claim 15, wherein an account identified by an account identifier associated with a deauthorized access point identifier remains activated.

20. The method of claim 15, wherein at least one of the plurality of account identifiers is associated with a plurality of access point identifiers.

\* \* \* \* \*